United States Patent [19]

Hellqvist

[11] 4,388,192
[45] Jun. 14, 1983

[54] PROCESS AND A DEVICE FOR PURIFYING WATER

[75] Inventor: Åke O. V. Hellqvist, Djurhamn, Sweden

[73] Assignee: Cinderella AB, Stockholm, Sweden

[21] Appl. No.: 272,150

[22] Filed: Jun. 10, 1981

Related U.S. Application Data

[63] Continuation of Ser. No. 79,015, Sep. 26, 1979, abandoned, which is a continuation of Ser. No. 961,902, Nov. 20, 1978, abandoned, which is a continuation of Ser. No. 853,667, Nov. 21, 1977, abandoned, which is a continuation of Ser. No. 660,889, Feb. 24, 1976, abandoned.

[30] Foreign Application Priority Data

Feb. 24, 1975 [SE] Sweden ............................. 7502057

[51] Int. Cl.³ ........................................... B01D 23/10
[52] U.S. Cl. .................................. 210/615; 210/620; 210/767; 210/169; 210/198.1; 210/496; 210/505; 210/508
[58] Field of Search ............... 210/601, 615, 620, 169, 210/496, 503, 505, 509, 510, 767, 198.1

[56] References Cited

U.S. PATENT DOCUMENTS

| | | | |
|---|---|---|---|
| 1,055,082 | 3/1913 | Rogers | 210/169 |
| 2,217,005 | 10/1940 | Clapp | 210/496 |
| 2,665,250 | 1/1954 | Willinger et al. | 210/169 |
| 3,540,593 | 11/1970 | Stewart | 210/169 |
| 3,542,674 | 11/1970 | Machlan | 210/509 |
| 3,835,813 | 9/1974 | Katz | 210/169 |
| 3,841,999 | 10/1974 | Bennett et al. | 210/169 |
| 3,974,072 | 8/1976 | Birchall et al. | 210/167 |

*Primary Examiner*—Peter A. Hruskoci
*Attorney, Agent, or Firm*—Ladas & Parry

[57] ABSTRACT

Water may be purified by passage through a filter of thickness 2 cm to 1 m composed from fibers obtained from a melt of composition about 80% diabase mineral and about 20% lime, at least 90% of the fibers having a diameter below 15 microns, the fiber solids content of the material being at most 20% of the volume at a flow rate above 10 meters per hour to remove suspended particles.

18 Claims, 1 Drawing Figure

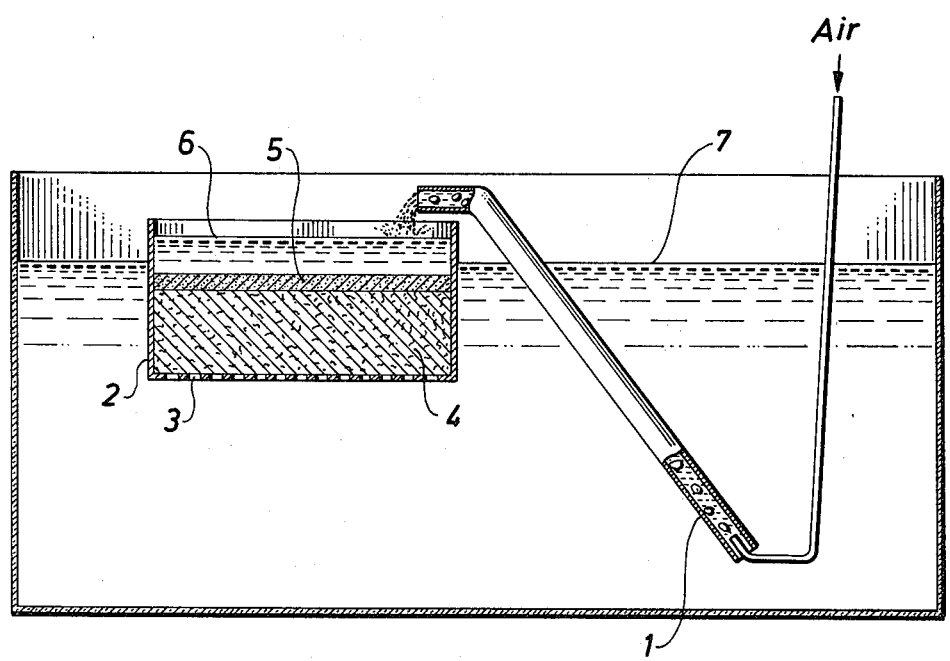

PROCESS AND A DEVICE FOR PURIFYING WATER

This application is a continuation of copending application Ser. No. 079,015 filed Sept. 26, 1979 (now abandoned) which is in turn a continuation of application Ser. No. 961,902 filed Nov. 20, 1978 (now abandoned) which was in turn a continuation of application Ser. No. 853,667 filed on Nov. 21, 1977 (now abandoned) which was in turn a continuation of application Ser. No. 660,889 filed Feb. 24, 1976 (now abandoned).

This invention is related to a process and a device for purifying water by removing micro-organisms which make it possible to remove and make harmless micro-organisms smaller than 10 microns as well as larger micro-organisms and especially within the range 10-100 microns. The invention comprises using for said purpose a filter material of an inert type, preferably an inorganic fibre material, e.g. glass wool and especially a so-called rock-wool, stone-wool, slag-wool or similar mineral wool materials.

The filter material is preferably produced by forming fibres of a melt, e.g. by pouring the melt onto a rotating disc or a similar device.

The fibre material should comprise a considerable and preferably a preponderant part and especially to at least 90% consist of fibres with a diameter below 15 microns. A suitable fibre diameter is about 1-5 microns.

The fibres should mainly be arranged randomly in three directions, i.e. in space.

The fibres should comprise at most 20%, preferably at most 10% and especially at most 5% of the volume of the fibre material, the rest of the volume containing of a void interspace and optionally some further constituent, such as a binder or a similar material, in a quantity which preferably does not exceed the volume of the fibres' solid.

The fibres are preferably arranged randomly and mainly without binder for mutual bonding of the separate fibres. Such a binder can, however, also be used provided that it does not essentially decrease the efficiency of the filter material for purifying water.

A suitable fibre solids content is about 3% by volume.

The fibre material should also be completely wettable with water and should maintain the original shape when saturated with or soaked in water.

It is preferable to use a fibre material which in the treated liquid exhibits a Z-potential which is essentially 0 or slightly negative, i.e. slightly cation active, preferably to a maximum of $-50$ mV.

A suitable fibre material is a so-called rock-wool, stone-wool or slag-wool or a similar material, preferably a material prepared from rock minerals, such as diabase and lime. A suitable weight ratio of mineral, especially diabase to lime, is about 80/20. Furthermore, coke is normally used when preparing the melt from which the fibres are prepared.

The process according to the invention can be used generally for purifying water, e.g. for purifying raw or untreated water, preferably after a treatment for removing of flocking materials, for sewage purification, especially after so-called three stage purification, for removing suspended substances and remaining flocked materials and also for a number of other aqueous liquids with a low content of organic materials as defined more extensively below.

The treatment according to the invention also removes micro-organisms below 10 microns in size. Thus, the process is efficient for removing bacteria and similar microbes, especially pathogenic bacteria. The mechanism by which said micro-organisms are removed can be postulated to depend on the build-up of a biologic layer or biologic film in the filter material, in which unwanted micro-organisms are consumed by other micro-organisms (e.g. protozoon) and a degradation by a biological oxidation process. For said purpose the water is oxygenated to a suitable degree before it is passed into contact with the filter, or by introducing oxygen or air into the filter material through absorption in a so-called drip bed embodiment.

The method according to the invention is also highly suited for simultaneously removing micro-organisms above 10 microns in size and preferably with a size between 10 and 100 microns or more. Such micro-organisms may e.g. consist of protozoons which are pathogenic for animals or human beings.

The reason why the method and the filter material according to the invention are so surprisingly efficient is not known with certainty. It is, however, probable that the efficiency of the process and material depends on a combination of a number of cooperating effects, especially that the fibre material by a suitable Z-potential in the liquid and/or by chemical structure and/or surface structure tends to improve the addition and ackumulation of micro-organisms to the surface of the fibres. A random arrangement of the fibres in essentially three directions or dimensions may also improve and contribute to this effect in that the fibres may act as mechanical traps for suspended particles or micro-organisms of various size ranges.

These cooperating effects lead to the result that it is possible to use according to the invention a very high flow rate in meters per hour ($m^3/m^2 \cdot h$). Thus, the area load or load per filter area unit may be maintained above about 1-1.5 meters per hour and up to 3-5 meters per hour or higher without sacrifying the efficiency. Said high load capacity of the material can be expected to depend on a combination of several factors, e.g. the good mechanical shape stability in water also when the water is streaming through the filter material which will have the result that the filter material maintains a loose structure which can easily be penetrated by the liquid. In spite of said high load capacity the material has a very good capacity for removing the micro-organisms mentioned above which are continuously picked up and degraded or decomposed in the filter material without sacrifice of the load capacity.

The filter bed thickness can be selected to a very low value in combination with the stated high load capacity values, e.g. a thickness below 1 meter down to 5-10 cms, or less with maintained high separating capacity.

The impurity content in the feed material, i.e. aqueous liquid to be treated, may vary within broad limits, e.g. from 5 to 50 $BOD_7$.

It is also preferable that the fibre material has a sufficient shape stability in the treated liquid when subjected to the flow of the treated liquid through the filter material so that the structure of the fibre material is maintained essentially unchanged with maintained high permeability to the liquid being filtered. The compressibility at the liquid flow load, e.g. 5-10 meters/hour, may e.g. be maintained below 20% and preferably below 10%, and preferably the filter material should exhibit a compression of less than 1% and especially exhibit no compression at all at a flow rate of 5-10 meters/hour. If desired, the filter material may comprise a supporting matrix or structure, e.g. consisting of coarser fibres, which contributes to the resistance against compression of the filter material and under the influence of the liquid flow.

Preferably a cube of the filter material should after soaking in a filtered liquid and subjected to a compressive load on surfaces of the cubic piece of filter material, which are perpendicular to the intended flow direction with 1 square inch area, exhibit a compression of less than 50%, preferably less than 10% and especially less than 5% when increasing the compressive load from 10 grams to 20 grams or from 50 grams to 150 grams.

Preferably the fibre structure is randomly oriented, i.e. the filter fibres are arranged randomly in all directions in space. There may, however, be a certain degree of orientation of the fibre directions depending upon the method of production used for the fibre materials or since some special effect is desired, such as forming mechanical traps with fibres crossing each other at an acute angle, especially with a preponderant orientation of the fibres in the direction of the liquid flow.

It is also possible to arrange the fibres perponderantly perpendicular to the direction of flow, e.g. with the fibres mainly oriented in a plane perpendicular to the direction of flow.

The filter may also be composed of a number of layers of the same kind of material or of various kinds of filter materials. The filter may e.g. comprise in the direction of flow first a layer of a coarser filter material which retains coarser particles which otherwise may clog the finer filter material which is used for water purification according to the invention.

It is also preferable that the filter is shaped so that it can be removed from the treated water without permitting removed impurities to be returned to the treated liquid by back-washing. If the filter is submerged in a tank containing the water to be treated the inlet to the filter container is preferably connected to the outlet from the propelling or circulation means, e.g. a pump. Alternatively and especially when the filter is arranged outside a tank containing the treated water and is connected to said tank through a conduit, said container should have a volume which is sufficient for accommodating any back-wash or back-flow of water so that re-introduction of impurities from the filter into the water of a liquid tank is prevented.

The filter material may also comprise a first layer which is permeable to micro-organisms up to 10 microns in size and preferably up to 50-100 microns in size, and a second, finer filter layer, i.e. a filter layer in which the average or maximum distance between the filter fibres is smaller so that the probability of mechanic trapping or contact between the micro-organisms and the filter fibres is increased.

The invention is especially related to a biological filter for treating aqueous liquids with a low BOD value. The $BOD_7$ value of the treated aqueous liquid (or water) is preferably below 50 and especially below 10, e.g. between 2 and 5. According to the invention it is possible to create in the filter material comprised by the invention an efficient biologic layer which at the stated BOD value of the treated water or aqueous liquid maintains a sufficient degree of efficiency and simultaneously is subjected to a continuous degradation so that clogging of the filter is prevented. The load on the filter may according to the invention be varied within broad limits. For optimum production capacity the load may be maintained about 1 meter per hour and especially above 2 meters per hour up to 10 meters per hour or higher. Lower loads can, however, also be maintained without loss of efficiency of the filter.

The filter is preferably maintained under aerobic conditions, i.e. the water which flows through the filter should have a sufficiently high oxygen content which can be achieved by aerating the water or by adding air or oxygen together with the water to the filter. Optionally also oxygen containing compounds may be added, e.g. per-oxygen compounds.

The process according to the invention is especially suited for purifying water which is used for maintaining alive animals or plants, e.g. tanks or pools for raising fish, aquaria, etc.

For said purposes the water is passed continuously or intermittently through a filter according to the invention. The water flow through the filter can be achieved with a pump, e.g. an air lift pump or mammut pump, in which the water is lifted with injected compressed air. The pump and/or filter may be arranged in and/or outside the quantity of water in which it is desired to maintain living animals (including fish) and plants. Prior to the biological filter according to the invention one may arrange a mechanical filter for removing the coarser particles, etc. which could otherwise clog the biological filter. The filter according to the invention should be shaped so that it can be removed from the treated water without permitting removed impurities to be reintroduced into the water by back-flow or back-washing and the filter should be shaped and arranged so that any such back-flow or back-washing or liberation of micro-organisms from the filter is not obtained to an essential extent or is completely avoided if the flow of water is discontinued. The inlet to the filter should preferably be connected to the outlet of a circulation pump.

When using a filter according to the invention for purifying the water in aquaria, fish raising plants or for similar purpose the filter can be used for separating and neutralizing bacteria and similar small micro-organisms as well as larger micro-organisms, such as protozoones which are parasitic or pathogenic, worm eggs, larvae, etc., which can be neutralized e.g. by mechanical trapping between the filter fibres, holding by electrical forces, such as by the influence of the Z-potential, as well as by the activity of micro-organisms which actively consume undesired constituents in the water. An example of parasites which can be efficiently removed with the filter according to the invention is the parasites Ichtyophyirius multifilius in aquaria fish and which have a size of from 50 microns up to about 500 microns depending upon the stage of evolution.

A filter material of the mineral wool type which is especially suited as a filter material according to the invention is the material sold by the Rockwool Company, Sweden, under the trade name "Grolätt".

The FIGURE discloses schematically a filter device for an aquarium with an air lift pump 1 which transfers the water to a filter container 2. Said filter container comprises a filter layer 4 according to the invention of mineral wool arranged on a perforated bottom 3 and above said filter layer a removable thinner layer of a coarser filter material 5 for removing coarser particles. The flowing water forms a liquid surface 6 in the filter container 2 at a certain level above the water level 7 in the aquarium and by the pressure corresponding to said liquid level difference the water in the filter container is forced through the filter layer and through the perforated bottom. The water circulating through the filter and the aquarium has a low content of organic impurities corresponding to a low BOD value and forms an active biological layer in the filter. Pathogenic microorganisms in the water are separated and destroyed in the filter by being mechanically trapped and by being attacked and destroyed in the biological layer.

The method is also suited for purifying water in swimming pools and similar waters.

A suitable filter layer thickness is about 2–20 cms. and especially 4–10 cms. The water pressure head is preferably up to 25 cms., especially up to 10 cms. and particularly up to 2–5 cms.

I claim:

1. A process for purifying water by removing suspended particles which comprises passing the water through a filter of an inorganic filter material of the rock-wool type, said filter material being of a thickness of about 2 cm to below 1 m and having been prepared by melting an inorganic material and forming the melt of fibers, said melt having a composition of about 80% diabase mineral and about 20% lime, at least 90% of the fibers of said material having a diameter below 15 microns, the fiber solids content of the filter material being at most 20% of the volume, said fiber material in the fully soaked condition in the filter exhibiting a compression of less than 50% when subjected to an increase of a load acting on the surface of the filter material from a starting value of 50 grams/sq. inch to an increased value of 150 grams/sq. inch, and passing the water through the filter at a flow rate of above 10 meters per hour to remove said suspended particles.

2. A process according to claim 1, characterized in that at least 90% of the fibers are of a diameter of from 1 to 5 microns.

3. A process according to claim 1, characterized by using a filter material with a Z-potential in the filtered liquid which is not above zero.

4. A process according to claim 1, characterized by purifying water with a low content of organic particles corresponding to a $BOD_7$ value of below 50.

5. A process according to claim 4, characterized by purifying water with a $BOD_7$ value below 10.

6. A process according to claim 1, characterized by purifying water which is used in a swimming pool.

7. A process according to claim 1, characterized by purifying water which is used for maintaining animals including fish.

8. A process according to claim 1, characterized by using a filter layer thickness of about 2–20 cm.

9. A process according to claim 1, characterized by oxygenating said water prior to passing it into a filter thereby maintaining in the filter a biological layer formed by micro-organisms in the treated water.

10. A process according to claim 9, characterized by purifying a water with a $BOD_7$ value below 50.

11. A process according to claim 1, characterized by using a filter material with a compression of less than 5%.

12. A process according to claim 1 wherein the filter material used consists of fibers formed by poring a said molten inorganic material on to a rotating disc.

13. A device for purifying water by removing suspended particles which comprises an inlet for impure water, an outlet for purified water and therebetween a filter of a thickness of about 5 cm to below 1 m and composed of an inorganic filter material of the rock-wool type, prepared by melting an inorganic material and forming the melt into fibers, said melt having a composition of about 80% diabase mineral and about 20% lime, at least 90% of the fibers of said material having a diameter below 15 microns, the fiber solids content of the filter material being at most 10% of the volume, said fiber material in the fully soaked condition in the filter exhibiting a compression of less than 50% when subjected to an increase of a load acting on the surface of the filter material from a starting value of 50 grams/sq. inch to an increased value of 150 grams/sq. inch.

14. A device according to claim 13, characterized in that at least 90% of the fibers are of a diameter of from 1 to 5 microns.

15. A device according to claim 13, wherein said filter material has a Z-potential in the filtered liquid which is not above zero.

16. A device according to claim 13, wherein the filter has a thickness of about 2–20 cm.

17. A device according to claim 13 comprising means for maintaining in the filter a biological layer formed by micro-organisms by means of introducing oxygenated water to said filter.

18. A device according to claim 13, wherein said filter material has a compression of less than 5%.

* * * * *